US012779848B2

(12) United States Patent
Byun et al.

(10) Patent No.: US 12,779,848 B2
(45) Date of Patent: Nov. 3, 2026

(54) ELECTROHYDRODYNAMIC JET PRINTING APPARATUS AND METHOD FOR CONTROLLING THE ELECTROHYDRODYNAMIC JET PRINTING APPARATUS

(71) Applicant: Enjet Co. LTD, Suwon-si (KR)

(72) Inventors: Do Young Byun, Seoul (KR); Vu Dat Nguyen, Suwon-si (KR); Baek Hoon Seong, Hwaseong-si (KR)

( * ) Notice: Subject to any disclaimer, the term of this patent is extended or adjusted under 35 U.S.C. 154(b) by 174 days.

(21) Appl. No.: 18/790,687

(22) Filed: Jul. 31, 2024

(65) Prior Publication Data

US 2025/0042151 A1 Feb. 6, 2025

(30) Foreign Application Priority Data

Aug. 2, 2023 (KR) ........................ 10-2023-0100958
Apr. 18, 2024 (KR) ........................ 10-2024-0052001

(51) Int. Cl.

*B41J 2/045* (2006.01)
*B41J 2/06* (2006.01)
*B41J 2/125* (2006.01)

(52) U.S. Cl.

CPC ....... *B41J 2/04581* (2013.01); *B41J 2/04558* (2013.01); *B41J 2/0456* (2013.01); *B41J 2/125* (2013.01); *B41J 2002/061* (2013.01)

(58) Field of Classification Search

CPC .. B41J 2/04558; B41J 2/0456; B41J 2/04536; B41J 2/04586; B41J 2/125; B41J 2/06;
(Continued)

(56) References Cited

U.S. PATENT DOCUMENTS 10,336,062 B2 * 7/2019 Sreenivasan ........... B41J 2/0458
2007/0273718 A1 * 11/2007 Yogi .......................... B41J 2/06
347/19

(Continued)

FOREIGN PATENT DOCUMENTS

CN 113500857 A 10/2021
CN 115243898 A 10/2022

(Continued)

OTHER PUBLICATIONS

Korea Intellectual Property Rights Information Service, English Abstract for KR1020120139436A, retrieved on Jul. 30, 2024, p. 1.

(Continued)

*Primary Examiner* — Stephen D Meier
*Assistant Examiner* — Thomas Ray Knief
(74) *Attorney, Agent, or Firm* — Cahn & Samuels, LLP

(57) ABSTRACT

The present disclosure relates to an electrohydrodynamic jet printing apparatus and a method for controlling printing of the electrohydrodynamic jet printing apparatus. The electrohydrodynamic jet printing apparatus according to the present disclosure includes a nozzle that ejects supplied ink as a droplet towards a substrate; an electrode that is formed on the nozzle to form an electric field between the nozzle and the substrate by an applied voltage; a voltage supplier that applies the voltage to the electrode; and a controller that controls the voltage supplier, the controller controlling in real time the voltage being applied from the voltage supplier to the electrode such that a size of the droplet being ejected from the nozzle is constant.

7 Claims, 11 Drawing Sheets

(58) Field of Classification Search
CPC .... B41J 2203/01; G06F 30/27; G06F 2113/08
See application file for complete search history.

(56) References Cited

U.S. PATENT DOCUMENTS

| | | | | |
|---|---|---|---|---|
| 2010/0033543 | A1 | 2/2010 | Piatt et al. | |
| 2012/0105528 | A1* | 5/2012 | Alleyne | B41J 2/06 347/14 |
| 2013/0278682 | A1 | 10/2013 | Piatt et al. | |
| 2015/0099059 | A1* | 4/2015 | Harjee | B41J 2/04593 427/8 |
| 2021/0260876 | A1* | 8/2021 | Byun | B41J 2/06 |
| 2021/0339525 | A1* | 11/2021 | Tsukagoshi | B41J 2/04558 |
| 2022/0414380 | A1* | 12/2022 | Price | G06V 20/49 |

FOREIGN PATENT DOCUMENTS

| | | | |
|---|---|---|---|
| JP | H11320853 | A | 11/1999 |
| KR | 1020110000942 | A | 1/2011 |
| KR | 1020120139436 | A | 6/2013 |
| KR | 1020220001500 | A | 1/2022 |

OTHER PUBLICATIONS

Korean Patent Office, Office Action for Korean Application No. 10-2024-0052001, dated Oct. 30, 2025, pp. 1-4.

Taiwan Intellectual Property Office, Ministry of Economic Affairs, Notification Letter of Examination Opinion for Patent Application No. 113128623, dated May 5, 2025, pp. 1-4.

* cited by examiner (a) (b)

(a)

(b)

ELECTROHYDRODYNAMIC JET PRINTING APPARATUS AND METHOD FOR CONTROLLING THE ELECTROHYDRODYNAMIC JET PRINTING APPARATUS

I. FIELD

The present disclosure relates to an electrohydrodynamic jet printing apparatus and method for controlling printing of the electrohydrodynamic jet printing apparatus, and more particularly, to an electrohydrodynamic jet printing apparatus that ejects a droplet using electrostatic force caused by an electric field formed between a nozzle and a substrate, and a method for controlling printing of the electrohydrodynamic jet printing apparatus.

II. BACKGROUND

In general, an inkjet printing apparatus or a dispenser refers to an apparatus that may be coupled to a sealed container filled with gas, liquid or other contents, and be used to eject a certain amount of the contents inside it using a pressurizing means or a pressure wave transmission means such as a piezoelectric element.

Recently, dispensers that eject chemical solutions for coating specific parts or for joint processing and the like are also used in precision industrial fields such as electronic components and camera modules that are becoming smaller. In addition, also in the organic light-emitting diode (OLED) display industry, inkjet printers are used to pattern color materials such as red or green of pixels or in organic film coating of encapsulation processes. Furthermore, applying materials such as ink in ways to connect open defects in electrodes such as a source, drain, and gate of a thin-film transistor of an OLED backplane is also being considered. Dispensers or printers used in such fields require more precise control of the discharge amount and discharge of fine droplets.

Piezoelectric and electrohydrodynamic (EHD) methods have been widely used as methods for jetting droplets. Among them, the electrohydrodynamic method is a method of applying a high voltage to the electrode in the nozzle to form an electric field between the nozzle and the substrate and ejecting ink using the electrostatic force caused by potential difference. It has been widely used for technology fields for precise ejection as it can realize a fine line width.

As shown in FIG. 1, in order to fill a chipping defect of a PCB substrate between 10~300 μmor a bank with precision, it is necessary to deposit an exact amount of droplet. However, during a long-term printing process, physical properties of the ink change according to the surrounding environment and idle conditions, making it impossible to jet droplets of the same volume even when the same process variables are input.

As shown in FIG. 2, while electrohydrodynamic jet printing is in progress, the ink interface at the tip of the nozzle is exposed to the outside, and as time passes, the solvent in the ink evaporates, changing the physical properties, including viscosity. During a printing process, the ejection of ink does not always proceed at regular time intervals, and may vary depending on printing requirements or the transfer distance of the nozzle. That is, the time that ink is exposed to the external environment before jetting occurs at the tip of the nozzle is not constant but can change. Therefore, even if the same solution is filled inside the nozzle, the physical properties, such as the viscosity of the ink at the moment jetting occurs, may be different. Especially, when performing ultra-precision printing of 100 μm or less, the smaller the volume of liquid formed at the tip of the nozzle, the greater the sensitivity of jetting due to solvent evaporation.

FIG. 3 shows a result of an experiment on the change in viscosity over atmospheric exposure time for the meniscus formed at the tip of the nozzle. As shown, one can see that as time passes, the solvent evaporates and the viscosity increases. Therefore, when a constant voltage is applied to the nozzle, it becomes impossible to eject a constant volume of droplets due to changes in the physical properties of the ink.

PRIOR ART LITERATURE

Patent Document

Korean Laid-open Patent No. 10-2012-0139436

III. SUMMARY

Therefore, a purpose of the present disclosure is to solve the problem of prior art mentioned above, that is, to provide an electrohydrodynamic jet printing apparatus that controls in real time a voltage being applied to an electrode for generating an electric field, or a flow rate of ink being supplied to a nozzle, in order to maintain the size of the droplet being ejected to be constant and not affected by the changes in the physical properties of the ink due to solvent evaporation of the ink supplied to the nozzle, and a method for controlling printing of the electrohydrodynamic jet printing apparatus.

Tasks that the present disclosure intends to solve are not limited to the tasks mentioned above, and other tasks not mentioned will be clearly understood by those skilled in the art from the description below.

The above-mentioned purpose may be achieved, according to the present disclosure, by an electrohydrodynamic jet printing apparatus including a nozzle that ejects supplied ink as a droplet towards a substrate; an electrode that is formed on the nozzle to form an electric field between the nozzle and the substrate by an applied voltage; a voltage supplier that applies the voltage to the electrode; and a controller that controls the voltage supplier, wherein the controller controls in real time the voltage being applied from the voltage supplier to the electrode such that a size of the droplet being ejected from the nozzle is constant.

Here, the electrohydrodynamic jet printing apparatus may further include an ink supplier that supplies the ink to the nozzle, wherein the controller may control in real time a flow rate of the ink being supplied to the nozzle by controlling the ink supplier such that the size of the droplet being ejected is constant.

Here, the electrohydrodynamic jet printing apparatus may further include an image acquisition part that acquires an image of the ink ejected from the nozzle, wherein the controller obtains the size of the droplet from the image acquired by the image acquisition part, and based on this, may control in real time the voltage being applied to the electrode from the voltage supplier or control in real time the flow rate of the ink being supplied to the nozzle by controlling the ink supplier.

Here, the image acquisition part may acquire the image of the droplet impacted on the substrate, and the controller may obtain the size of the droplet from a size area of the droplet of the acquired image.

Here, the electrohydrodynamic jet printing apparatus may further include a droplet volume measurement part that measures a volume of the droplet ejected to the substrate or to a separate test substrate, wherein the size of the droplet obtained from the image acquired by the image acquisition part is stored regarding an optimal droplet volume measured from the droplet volume measurement part, prior to printing, and the controller may compare the stored size of the droplet and the size of the droplet obtained from the image acquired by the image acquisition part in real time, and control in real time the voltage being applied to the electrode from the voltage supplier or control in real time the flow rate of the ink being supplied to the nozzle by controlling the ink supplier.

Here, the controller may control a cycle or magnitude of the voltage being supplied from the voltage supplier.

Here, the voltage supplier may include a first voltage supplier that supplies the voltage in a constant cycle and magnitude; and a second voltage supplier that supplies an additional voltage that is combined with the voltage being supplied from the first voltage supplier to form an aggregate voltage applied to the electrode, wherein the controller may control such that the size of the droplet being ejected is constant by controlling the second voltage supplier according to the size of the droplet being detected in real time.

Here, the ink supplier may include a flow rate controller using pneumatic pressure, screw rotation or piezoelectric force, and the controller may control in real time the flow rate of the ink being supplied to the nozzle by controlling the flow rate controller.

Here, the electrohydrodynamic jet printing apparatus may further include a jet environment information provider that provides jet environment information between the nozzle and an impact point, wherein the controller may accumulate a pre-printing result according to the jet environment information and a printing condition in a database, to predict an actual result being printed on a substrate, and perform printing while changing the printing condition provided in the database based on the jet environment information provided from the jet environment information provider.

Here, the controller may construct a printing prediction model for predicting an actual result being printed on the substrate using machine learning techniques based on the database regarding the jet environment information and the printing condition, and may control printing under the printing condition provided in the printing prediction model based on the jet environment information.

In addition, the above-mentioned purpose may be achieved, according to the present disclosure, by a method for controlling printing of an electrohydrodynamic jet printing apparatus that ejects a droplet towards a substrate using a force of an electric field generated by a voltage being applied to an electrode formed on a nozzle, the method including obtaining a size of the droplet being ejected; and controlling in real time the voltage being applied to the electrode such that the size of the droplet being ejected from the nozzle is constant.

Here, the method for controlling printing of an electrohydrodynamic jet printing apparatus may further include controlling in real time a flow rate of the ink being supplied to the nozzle by controlling an ink supplier that supplies the ink to the nozzle such that the size of the droplet being ejected from the nozzle is constant.

Here, the size of the droplet may be obtained by acquiring an image of the droplet impacted on the substrate and then obtaining a size area of the droplet of the acquired image.

Here, the method for controlling printing of an electrohydrodynamic jet printing apparatus may further include ejecting an optimal volume droplet to the substrate or to a separate test substrate, prior to printing; and obtaining and storing the size of the optimal volume droplet from the image of the droplet impacted on the substrate, and comparing the stored size of the droplet and the size of the droplet obtained from the acquired image in real time, and then controlling in real time the voltage being applied to the electrode such that the size of the droplet being ejected from the nozzle is constant or controlling in real time the flow rate of the ink being supplied to the nozzle.

According to the above-mentioned electrohydrodynamic jet printing apparatus and method for controlling printing of the electrohydrodynamic jet printing apparatus of the present disclosure, by controlling the size of a droplet being ejected and controlling in real time the voltage being applied to an electrode or the flow rate of ink being supplied to a nozzle, even when there are changes in the physical properties of the ink due to solvent evaporation of the ink, there is an advantage of being able to eject droplets of constant size.

In addition, there is an advantage that printing precision can be improved by performing printing while controlling in real time the printing conditions being provided by a printing prediction model constructed using machine learning techniques.

IV. BRIEF DESCRIPTION OF THE DRAWINGS

Figure 9:
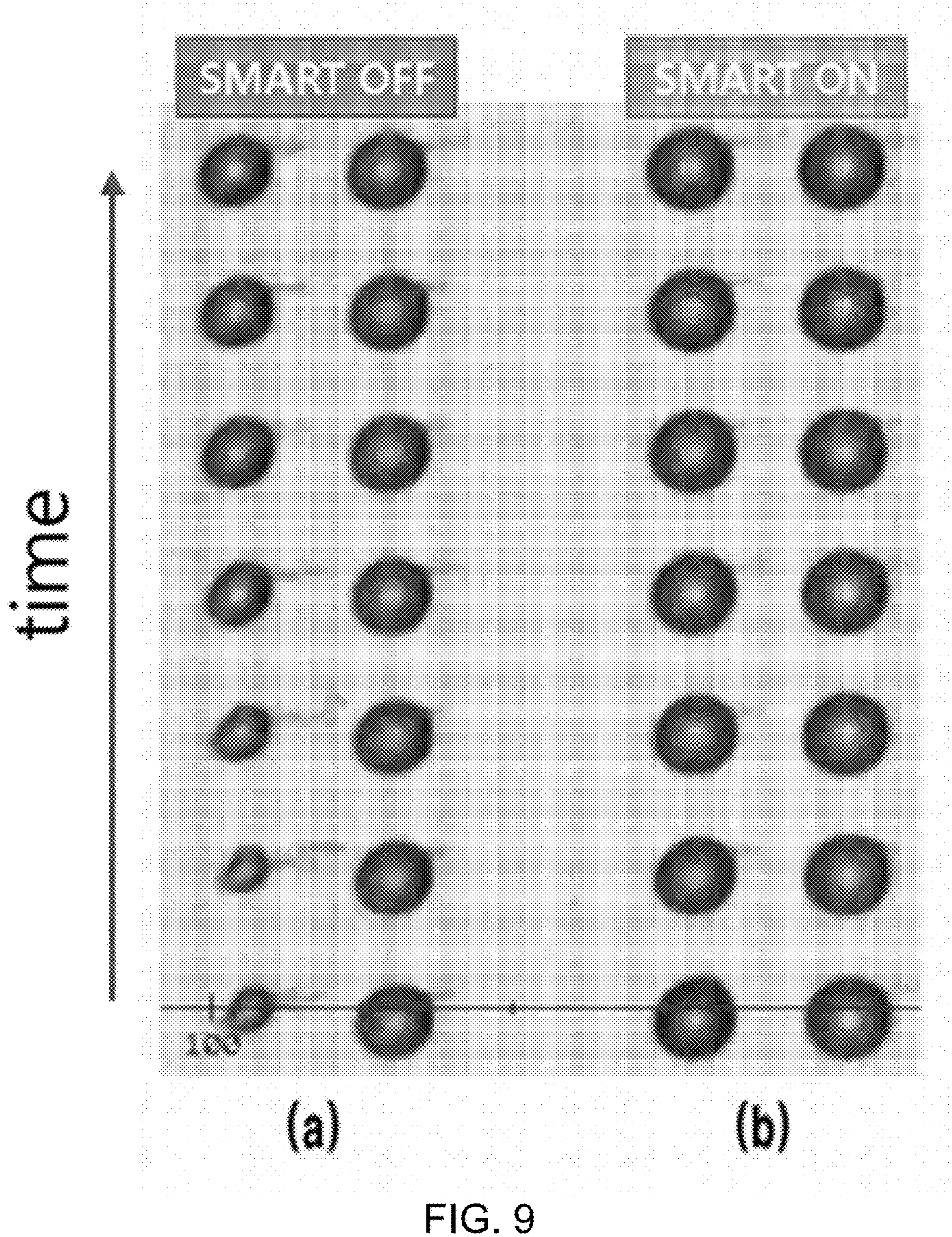

FIG. 9 compares a result of droplets ejected by a conventional electrohydrodynamic jet printing apparatus and a result of droplets ejected by an electrohydrodynamic jet printing apparatus according to the present disclosure.

Figure 10:
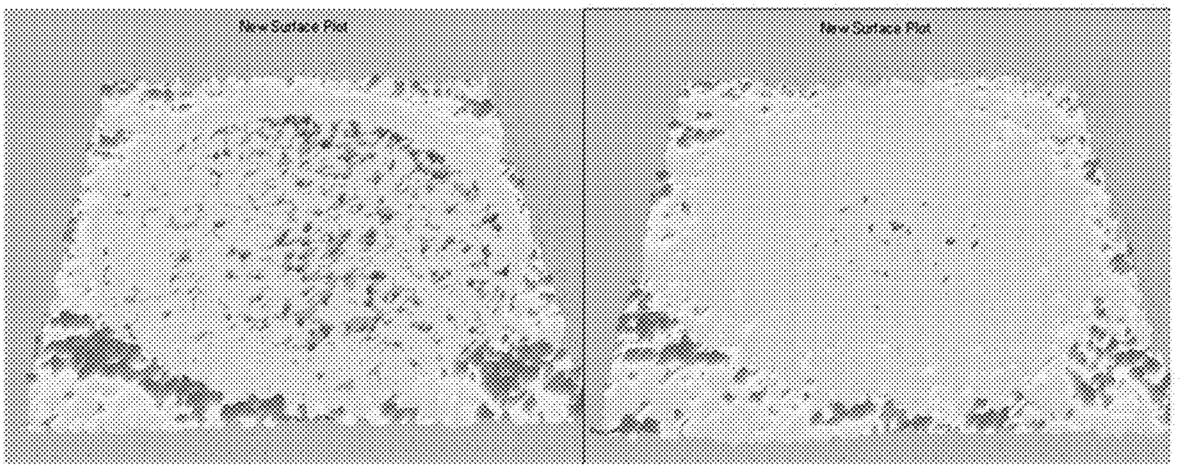

FIG. 10 shows a result of measuring the volume of a defective part of a substrate using a confocal microscope and then testing the volume again after filling the defective part by performing printing according to the present disclosure.

Figure 11:
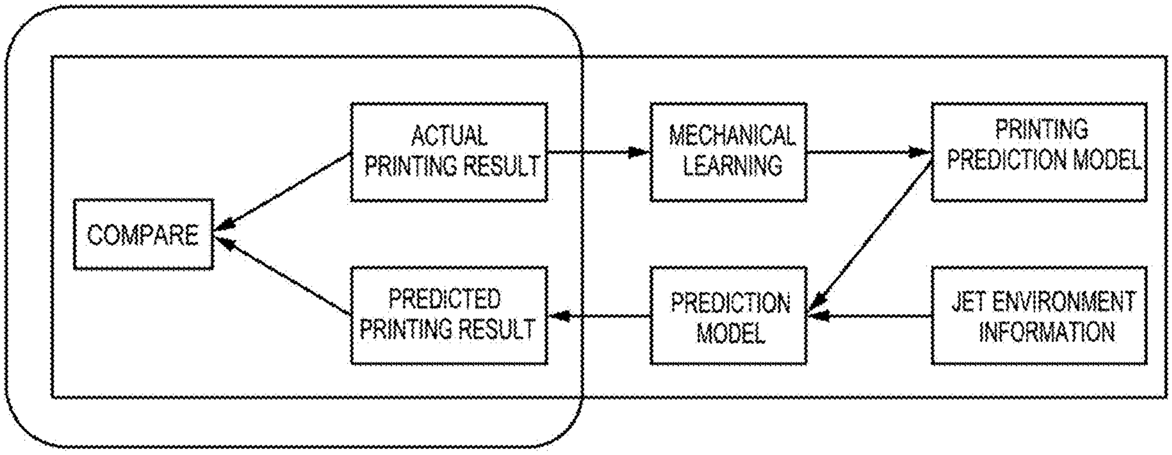
Figure 11:
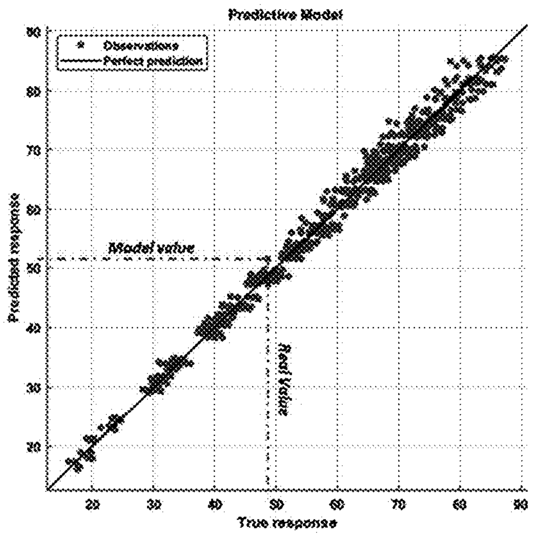
Figure 11:
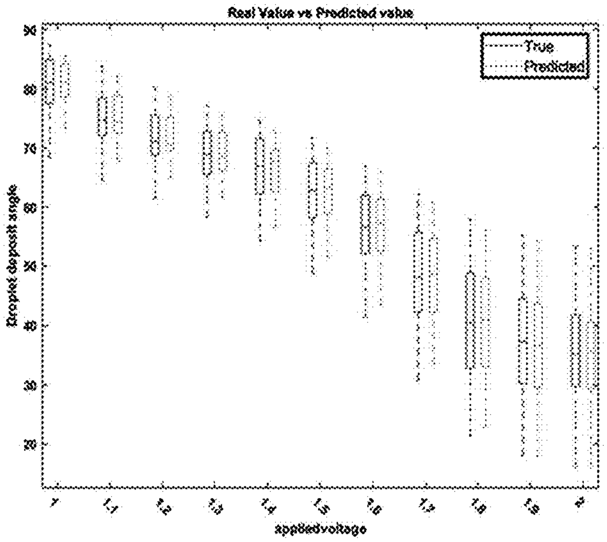

FIG. 11 shows a process of constructing a printing prediction model according to the present disclosure and a result of comparing a printing predicted result predicted from the printing prediction model and an actually measured printing result.

V. DETAILED DESCRIPTION

Specific details of the embodiments are included in the detailed description and drawings.

Advantages and features of the present disclosure and methods for achieving them will become clear by referring to the embodiments described in detail below along with the accompanying drawings. However, the present disclosure is not limited to the embodiments disclosed below and may be implemented in various different forms, and thus the present embodiments are merely provided to ensure that the disclosure of the present disclosure is complete and to fully inform those skilled in the technical field to which the present disclosure pertains the scope of the disclosure, and the present disclosure is only defined by the scope of the claims. Like reference numerals refer to like elements throughout the specification.

Hereinbelow, based on embodiments of the present disclosure, the present disclosure will be described with reference to the drawings for describing an electrohydrodynamic jet printing apparatus and a method for controlling printing of the electrohydrodynamic jet apparatus.

Figure 1:
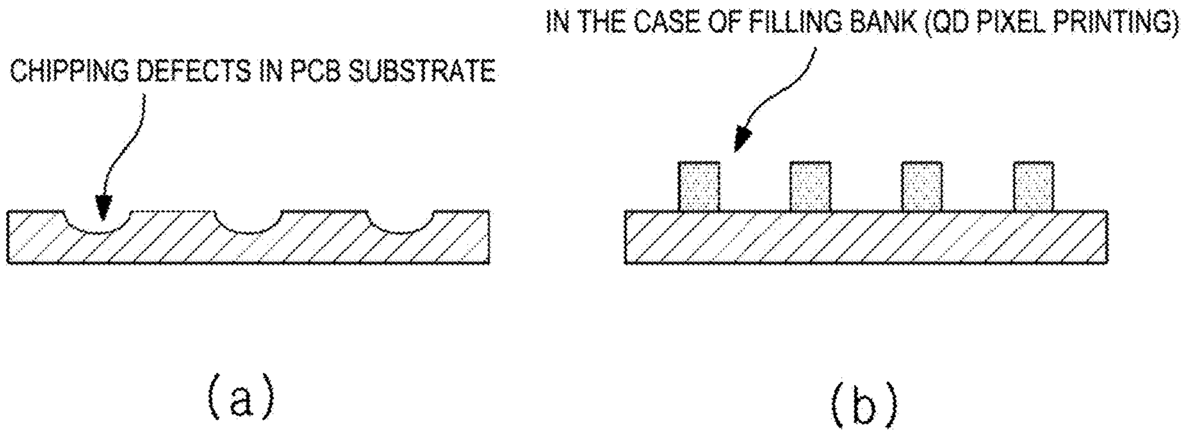
FIG. 1 shows examples where an electrohydrodynamic jet printing apparatus according to the present disclosure may be used for ejecting fine droplets.
Figure 2:
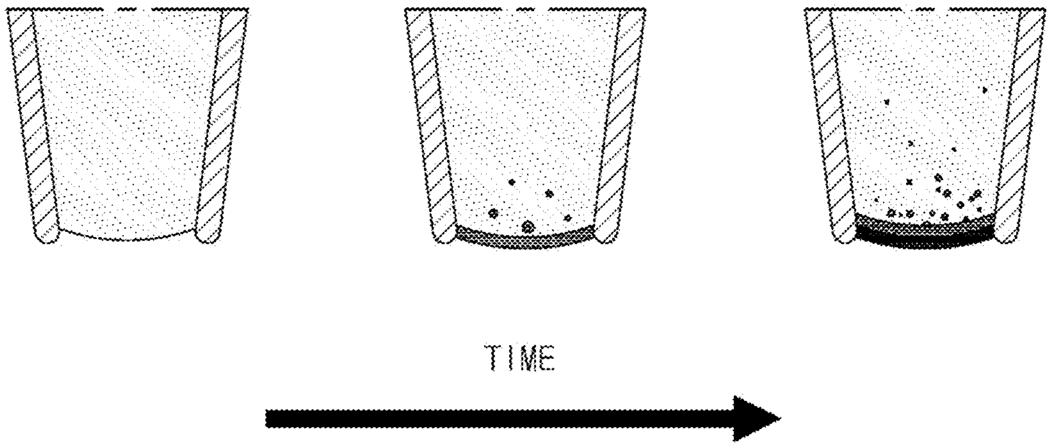
FIG. 2 shows a process where ink at a nozzle end is exposed to outside such that a solvent evaporates over time, thereby causing changes in physical properties of the ink such as viscosity.
Figure 3:
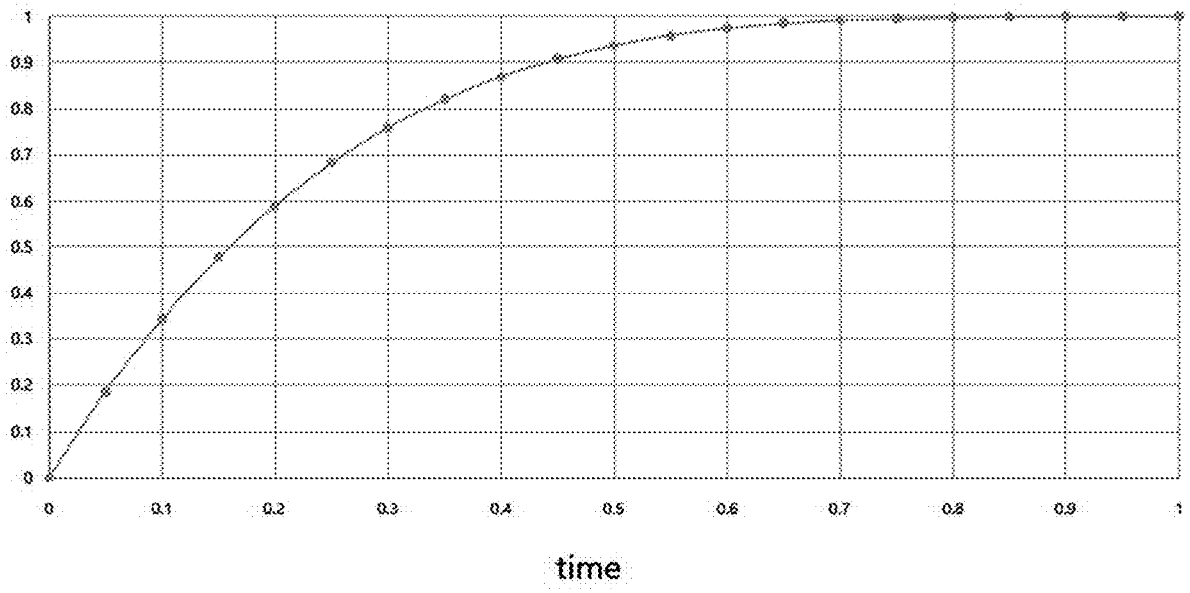
FIG. 3 shows a result of experimenting the changes in viscosity over time when the ink at the nozzle end is exposed to outside.
Figure 4:
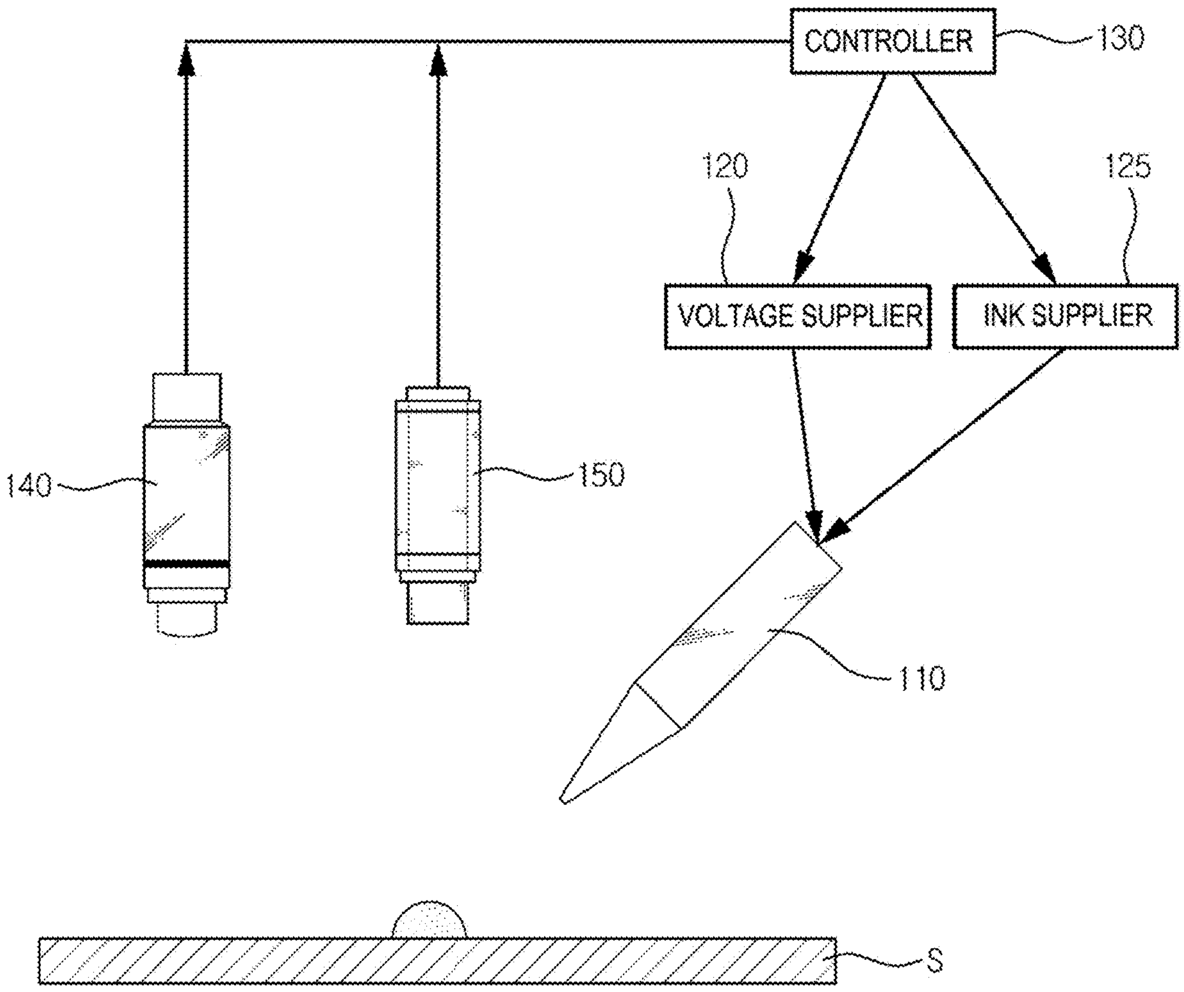
FIG. 4 is a schematic view of an electrohydrodynamic jet printing apparatus according to an embodiment of the present disclosure.
Figure 5:
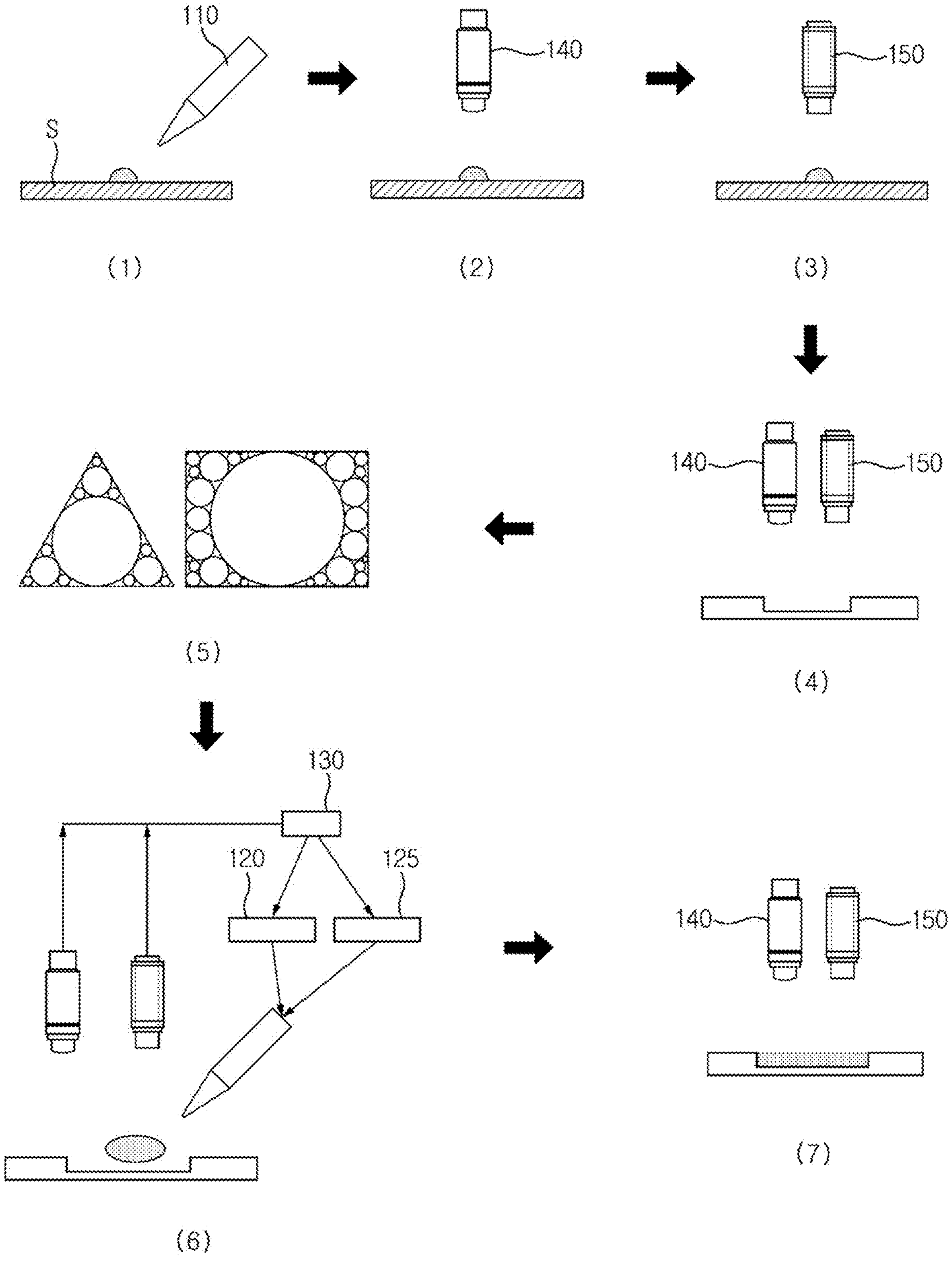
FIG. 5 shows a printing process sequence on a defective part of a substrate by the electrohydrodynamic jet printing apparatus according to an embodiment of the present disclosure.
Figure 6:
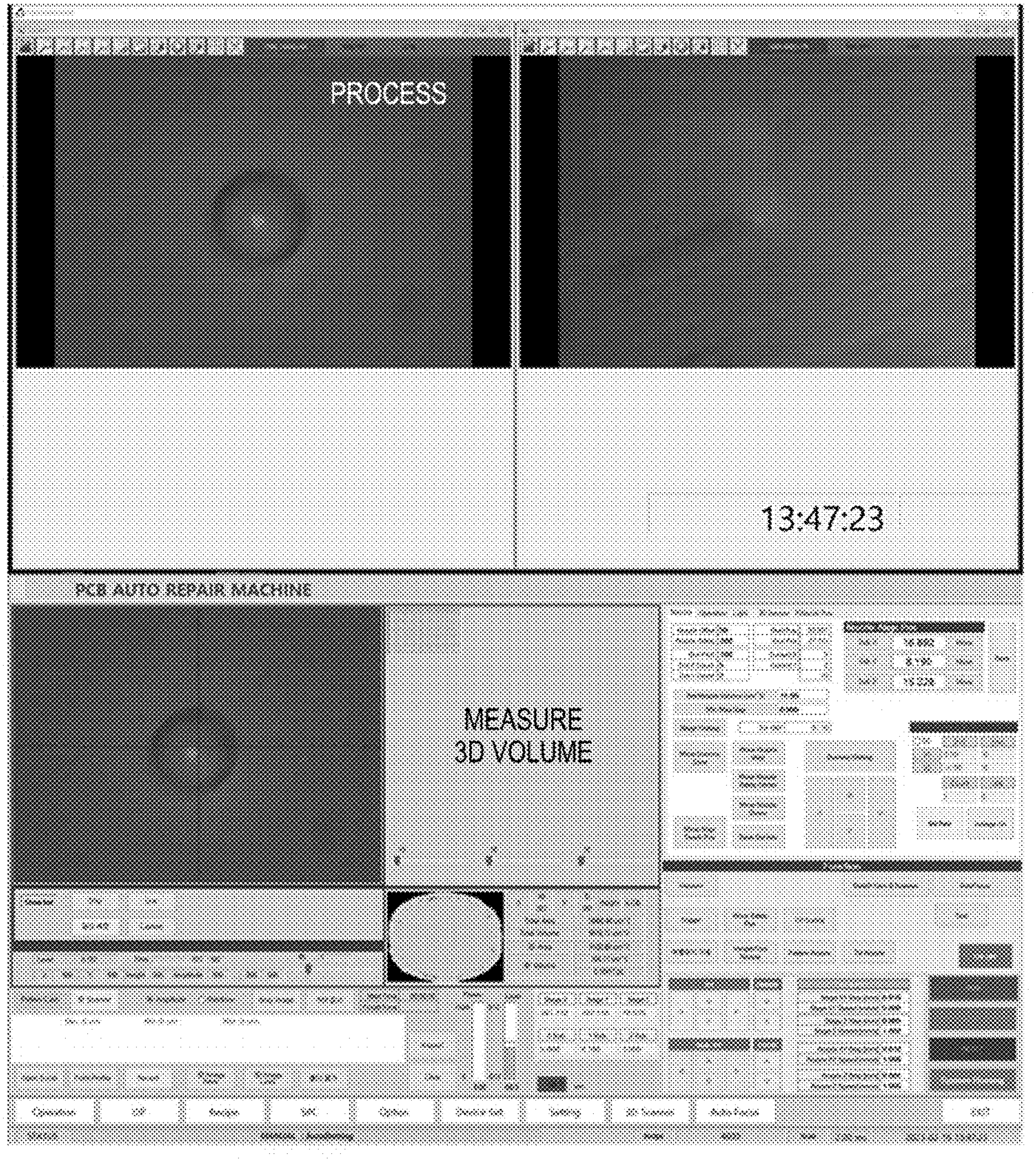
FIG. 6 shows how a volume of an ink droplet ejected on a substrate is measured by a droplet volume measurement part.
Figure 7:
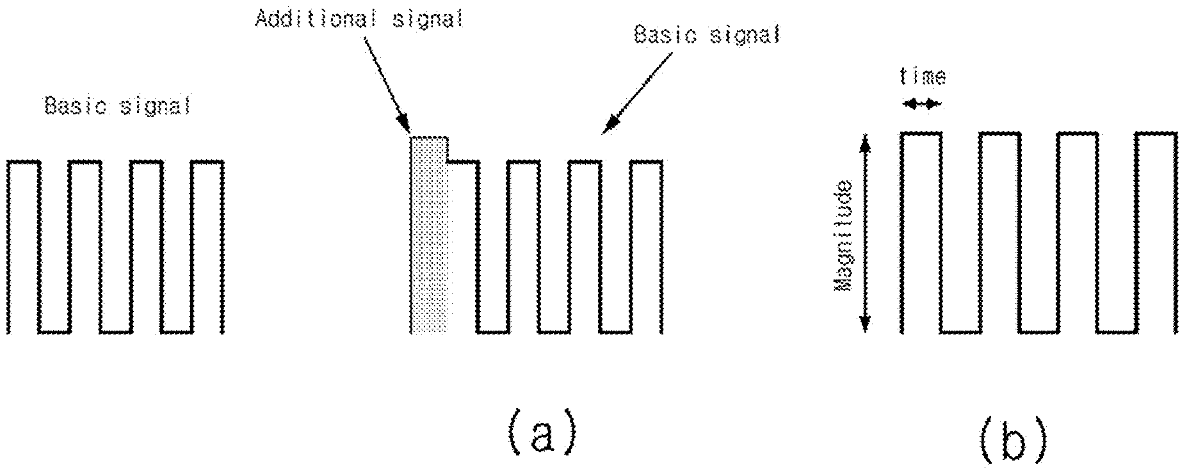
FIG. 7 shows an example of a voltage control signal being applied to an electrode according to an embodiment of the present disclosure.
Figure 8:
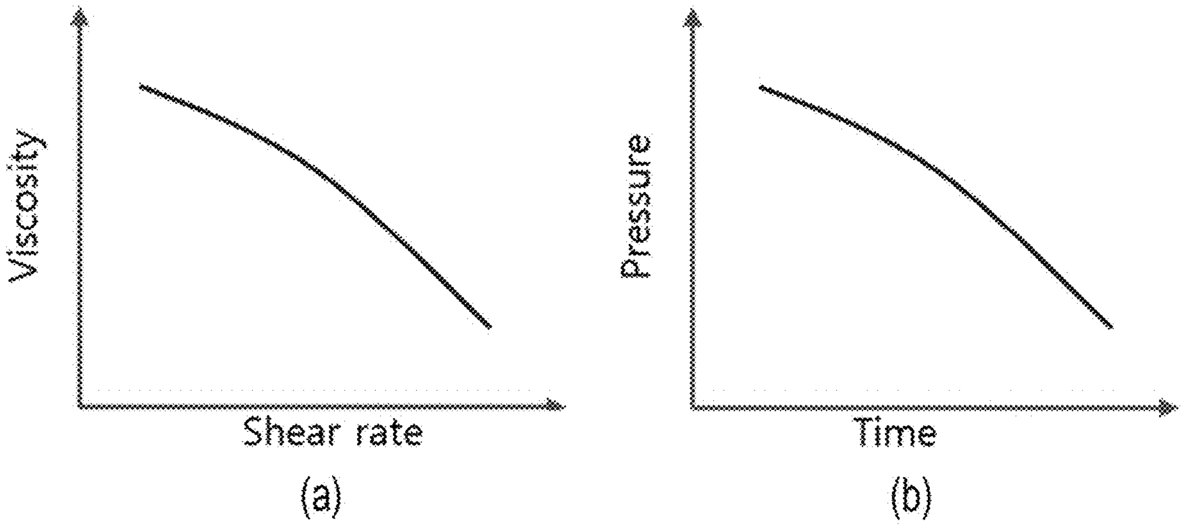
FIG. 8 are diagrams explaining the magnitude of pneumatic pressure being applied from the ink supplier according to changes in viscosity caused by shear force.

FIG. 4 is a schematic view of an electrohydrodynamic jet printing apparatus according to an embodiment of the present disclosure, FIG. 5 shows a printing process sequence for a defective part of a substrate by the electrohydrodynamic jet printing apparatus according to an embodiment of the present disclosure, FIG. 6 shows how a volume of an ink droplet ejected on a substrate is measured by a droplet volume measurement part, FIG. 7 shows an example of a voltage control signal being applied to an electrode according to an embodiment of the present disclosure, FIG. 8 are diagrams explaining the size of pneumatic pressure being applied from the ink supplier according to changes in viscosity caused by shear force, FIG. 9 compares a result of droplets ejected by a conventional electrohydrodynamic jet printing apparatus and a result of droplets ejected by an electrohydrodynamic jet printing apparatus according to the present disclosure, and FIG. 10 shows a result of measuring the volume of a defective part of a substrate using a confocal microscope and then testing the volume again after filling the defective part using printing according to the present disclosure.

An electrohydrodynamic jet printing apparatus according to an embodiment of the present disclosure may be configured to include a nozzle 110, an electrode (not shown), a voltage supplier 120, and a controller 130. In addition, an ink supplier 125 may be further included. In addition, an image acquisition part 150 or a droplet volume measurement part 140 may be further included.

The nozzle 110 ejects droplets towards a substrate (S) through a nozzle hole formed at one end. Inside the nozzle 110, a chamber may be equipped to store the ink being supplied. Although not shown in the drawings, there may be formed a separate driving part for moving or rotating the nozzle 110 in XYZ axis directions.

As shown in FIG. 4, the nozzle 110 may be arranged at an inclined angle, but is not necessarily limited to this, and may be arranged vertically. If the nozzle 110 is arranged at an inclined angle, the image acquisition part 150, which will be described later, may be arranged vertically above a point where a droplet is impacted on the substrate, and acquire an image, thereby acquiring an image without distortion.

On the nozzle 110, an electrode (not shown) may be formed. For example, the electrode may be formed inside the nozzle 110. However, the electrode is not necessarily disposed inside the nozzle 110, but may be disposed in various known ways and locations. Alternately, the nozzle 110 may be made of a metallic material and the nozzle 110 itself may serve as an electrode. Additionally, an outer surface of the electrode may be coated or surrounded with an insulating material.

The voltage supplier 120 applies voltage to the electrode to form an electric field between the nozzle 110 and the substrate (S). When the voltage is applied to the electrode, charged ink may be ejected while forming droplets through the nozzle hole using electrostatic force caused by the electric field.

The ink supplier 125 supplies ink to the nozzle 110. The ink supplier 125 may be configured to include an ink storage tank (not shown) for storing ink, and a flow rate controller (not shown) for supplying the ink stored in the ink storage tank to the nozzle 110 while controlling the flow rate of the ink being supplied. The flow rate controller transfers the ink stored in the ink storage tank to the nozzle 110 using pneumatic pressure, screw rotation or piezoelectric force, wherein the flow rate controller may control the flow rate of the ink being supplied by controlling the magnitude of the pneumatic pressure being applied, rotation speed of the screw, or the magnitude of the piezoelectric force.

The controller 130 controls the voltage supplier 120. More specifically, the controller 130 may control in real time a magnitude or cycle of the voltage being supplied to the electrode. Here, in the present disclosure, when performing printing, the controller 130 does not apply the voltage in a constant magnitude or cycle, but may control such that different voltage is applied in real time.

In addition, the controller 130 may control the ink supplier 125. More specifically, by controlling the flow rate controller constituting the ink supplier 125, the controller 130 may control in real time the flow rate of the ink being supplied to the nozzle 110. In the present disclosure, when performing printing, the controller 130 does not supply the ink to inside of the nozzle 110 in a constant flow rate, but may control in real time such that a different flow rate is supplied.

During a printing process, ejection of ink does not always proceed at a constant time interval, but may vary depending printing requirements or the transfer distance of the nozzle 110. That is, the time that the ink is exposed to the external environment before jetting occurs from the tip of the nozzle 110 is not constant but may vary. Therefore, even if the same solution is filled inside the nozzle 110, physical properties such as viscosity of the ink and the like may change at the moment when solvent evaporates and jetting occurs. Therefore, in a case where a constant voltage is applied to the electrode, the size of the ink being ejected from the nozzle 110 may change due to changes such as the viscosity, caused by the evaporation of solvent. In addition, the size of the ink being ejected may vary due to thixotropy of the ink caused by shear force on an inner surface of the nozzle 110.

Thus, in the present disclosure, the controller 130 controls in real time the voltage being applied to the electrode from the voltage supplier 120 such that the size of the droplet being ejected from the nozzle 110 is constant even when the physical properties of the ink change due to the evaporation of the ink solvent supplied to the nozzle 110.

Moreover, in the present disclosure, the controller 130 may control in real time the flow rate of the ink being supplied to the nozzle 110 along with the control of voltage, by controlling the ink supplier 125 such that the size of the droplet being ejected from the nozzle 110 is constant.

Here, the controller 130 may compare in real time the size of the droplet being ejected, and depending on this, control the voltage being applied or the flow rate of the ink being supplied to inside of the nozzle 110.

The image acquisition part 150 acquires an image of the ink ejected from the nozzle 110. For example, the image acquisition part 150 may be a camera that acquires a 2D image. The image acquisition part 150 may desirably be disposed vertically above the impact point of the droplet on the substrate (S), to acquire the image of the impacted droplet from vertically above. In the present disclosure, it is possible to determine the size of the droplet being ejected from the nozzle 110 based on the size area that the droplet occupies in the image acquired by the image acquisition part 150, and this is because, if the image acquisition part 150 had been disposed at an inclined angle, an image distortion would have occurred, making it difficult to determine the exact size of the droplet.

The controller 130 may determine the size of the droplet from the image that the image acquisition part 150 acquired, and based on this, the controller 130 may control in real time the voltage supplier 120 or the ink supplier 125. For example, in a case where the size of the droplet that the controller 130 determined in real time became smaller than the size of a previously impacted droplet due to an increase of ink viscosity caused by the evaporation of solvent, the controller 130 may maintain a constant size of the droplet being ejected from the nozzle 110 by controlling in real time such that the magnitude of the voltage being applied from the voltage supplier 120 or the flow rate of the ink being supplied to the nozzle is increased.

Here, when the controller 130 controls printing while comparing the size of the droplet, it needs a droplet size that can be a reference. Hence, in the present disclosure, a droplet volume measurement part 140 may be further included. The droplet volume measurement part 140 measures a volume of the droplet ejected on the substrate (S) or on a separate test substrate. For example, the droplet volume measurement part 140 may be formed as a conventional confocal microscope.

Prior to printing, a droplet may be ejected from the nozzle 110 to an edge of the substrate (S) or on the separate test substrate, and the droplet volume measurement part 140 may measure the volume of the ejected droplet. Here, until an optimal volume of droplet is ejected, it is possible to repeat the droplet ejection while varying the voltage being applied to the electrode or the flow rate of the ink being supplied to the nozzle 110. Here, the optimal volume of droplet can mean the volume to provide the best results for the printing purpose. The optical volume of droplet can vary depending on the area or volume of the region being printed, and it can also vary based on the printing position. When the optimal volume of droplet is ejected, the image acquisition part 150 may acquire an image of that droplet, and obtain the size of the droplet ejected on the substrate (S) from that image, and store it. That is, it is possible to store the size of the droplet being ejected from the nozzle 110 that corresponds to the size area of the ink ejected on the substrate (S) obtained by the image acquisition part 150. The stored size of the droplet may be a reference size for control by the controller 130, and the size of the droplet may be determined based on the size area of the droplet printed on the substrate (S) by the image acquisition part 150. The controller 130 may compare the size of the droplet measured in real time with reference to the size of the optimal volume of droplet stored from the image acquired in real time by the image acquisition part 150 when printing, and control the voltage being applied to the electrode from the voltage supplier 120 or the flow rate of the ink being supplied to the nozzle 110 by the ink supplier 125 such that the size of the droplet does not change due to changes in the physical properties such as viscosity caused by the evaporation of solvent.

For reference, FIG. 5 shows the above-mentioned printing process sequentially. This process will be described sequentially once again as follows. Prior to printing, a droplet is ejected on a substrate (S) or on a test substrate ((1) of FIG. 5), and whether it is an optimal volume droplet required when printing is measured using the droplet volume measurement part 140 ((2) of FIG. 5). The required droplet volume may vary depending on the printing precision. FIG. 6 is a software constituting the droplet volume measurement part 140, illustrating the process in which the volume of the droplet ejected on the substrate (S) is obtained. Since calculating the volume using a confocal microscope is a known technique, a detailed description of this will be omitted.

When the volume of ejected droplet obtained upon repeating (1) and (2) of FIG. 5 is an optimal volume, the image acquisition part 150 acquires a 2D image of that droplet ((3) of FIG. 5), and based on this, obtains the size of the droplet impacted on the substrate (S) corresponding to the optimal volume droplet. Here, the size of the droplet may be measured based on the size area of the droplet in the image acquired. The reason for obtaining the optimal droplet volume and then obtaining the corresponding size of the droplet prior to printing as such is because the size (size area) of the droplet impacted on the substrate (S) corresponding to the droplet of the same volume varies depending on the type of the substrate (S), type of the ink and the like.

Prior to printing, a 2D image and a 3D volume of a defective part of the substrate (S) where ink is to be deposited are measured ((4) of FIG. 5), and based on this, the controller 130 creates a Printing Map ((5) of FIG. 5). In a case where a certain amount of ink is supplied and filled for a defective part of the substrate (S), the image acquisition part 150 determines the location and size of the corresponding defective part based on the image acquired by the image acquisition part 150, and based on this, the optimal droplet size and the printing location may be determined. Further, the volume of the defective part may be obtained by the volume measurement part 140, and the Printing Map of the droplet to be impacted on the substrate (S) may be obtained. Here, the target size and volume of the droplet may be obtained utilizing a database obtained from (1) to (3) of FIG. 5.

Next, printing is performed based on the created Printing Map, wherein the controller 130 obtains the size of the droplet being ejected on the substrate (S) in real time based on the size of the droplet corresponding to the optimal volume droplet stored, and controls the voltage being applied to the electrode or controls the flow rate of the ink being supplied to the nozzle 110, thereby controlling such that a constant size droplet is ejected even when the physical properties of the ink such as viscosity change due to evaporation of the ink deposited at the tip of the nozzle 110.

Lastly, after filling the ink on the defective part and completing the printing, the 2D image and 3D volume of the defective part may be measured to determine whether printing is performed well ((7) of FIG. 5).

For reference, (a) of FIG. 10 shows a result of measuring the volume of a defective part by the volume measurement part 140 prior to printing, and (b) of FIG. 10 shows a volume test performed regarding the defective part after performing printing on the defective part depending on what was described with reference to FIG. 5.

Controlling the voltage from the voltage supplier 120 being applied to the electrode and controlling the flow rate that the ink supplier 125 supplies to the nozzle 110 by the controller 130 as described above will be described in more detail hereinbelow.

The controller 130 may control the voltage being applied through the voltage supplier 120 in a method shown in FIG. 7. For example, the voltage supplier 120 may consist of a first voltage supplier and a second voltage supplier. The first voltage supplier supplies voltage (basic signal) of a constant cycle and magnitude while printing is in progress, as shown on the left side of the drawing. Here, when the size of the droplet becomes smaller than the reference size due to evaporation of the solvent, the second voltage supplier may momentarily supply additional voltage, as shown in (a) of FIG. 7, so that the droplet of the reference size can be ejected again. Here, the magnitude of the voltage being additionally supplied momentarily by the second voltage supplier may vary depending on the size of the droplet measured in real time.

Alternately, when the size of the droplet becomes smaller than the reference size due to evaporation of the solvent, as shown in (b) of FIG. 7, it is possible to control the cycle or magnitude (basic signal) of the voltage being supplied from the voltage supplier 120 for a certain period of time such that the droplet of reference size can be ejected.

As shown in (a) of FIG. 8, shear force of an inner surface of the nozzle 110 may cause physical properties of the ink such as the viscosity to change, leading to an increase or decrease of the size of the droplet being ejected from the nozzle 110 compared to the reference size. Here, as shown in (b) of FIG. 8, by decreasing or increasing the pneumatic pressure of the ink supplier 125 that controls ink supply in the pneumatic method, the flow rate of the ink may be controlled to eject ink of constant droplets.

(a) of FIG. 9 shows droplets actually printed when a constant voltage is applied and ink of a constant flow rate is supplied to the nozzle 110 during printing operations of prior art, whereas (b) of FIG. 9 shows droplets actually printed when controlling the voltage being applied for generating an electric field or controlling the flow rate of the ink being supplied to the nozzle 110 upon comparing in real time the size of the droplet being ejected as described above according to the present disclosure. It can be confirmed that when a constant voltage and pneumatic pressure (pneumatic pressure for supplying ink to the nozzle 11) are applied during printing as in prior art, the size of the droplet is not constant depending on the solvent evaporation amount of the ink, whereas when the voltage and pneumatic pressure are controlled as in the present disclosure, droplets of constant size are ejected regardless of changes in physical properties of the ink.

In order to maintain a uniform size of the droplets during printing, in the present disclosure as mentioned above, the controller 130 may control the voltage being applied to the electrode or the flow rate of the ink being supplied to the nozzle 110. Moreover, according to the present disclosure, in order to further improve the printing performance, the controller 130 may not only control the voltage being applied to the electrode and the flow rate of the ink being supplied to the nozzle 110, but also control other printing conditions such as the printing speed, distance between the nozzle 110 and the substrate (S), etc.

Ink may have various viscosities, surface tensions, electrical conductivity, permittivity, etc., and printing conditions may vary depending on the characteristics of the ink. In addition, the printing conditions may vary depending on whether the type of the substrate (S) is an organic material, inorganic material, glass, ceramic, etc. In addition, the printing conditions may vary depending on the printing environment such as ambient temperature and humidity, atmospheric gas, and vacuum environment. In addition, the electric field distribution may vary depending on the presence or absence of any structure, micro-element, electric circuit, coating film, etc. on the substrate (S), which may cause differences in printing performance and thus change printing conditions.

As such, in order to implement the optimal printing performance according to the type of ink and substrate, printing environment, etc., the present disclosure accumulates printing results according to the printing environment for various inks and substrates(S) into a database, predicts the results to be printed on the actual substrate (S), and changes the printing conditions accordingly to perform printing.

A jet environment information provider (not shown) stores various jet environment information that affects printing. Information between the nozzle 110 and the point where the droplet is impacted may be stored. Here, the information between the nozzle 110 and the impact point may refer to information about the nozzle 110 (for example, size of the nozzle 110), information about the impact point (for example, information about the material of the substrate (S) or material of the impact point, information about the shape of the impact point), information about the space between the impact point and the nozzle 110 (for example, 3D shape around the impact point), information about the characteristics of ink such as viscosity, electrical conductivity, surface tension, and permittivity, etc.

The jet environment information provider may be configured to include a storage part and a sensing part.

The storage part is something like a storage device in a computer, which stores jet environment information data provided by the user. The sensing part may measure shape information surrounding the impact point where the droplet ejected from the nozzle is impacted. The sensing part may include an optical unit for photographing an image surrounding the impact point. In addition, the sensing part may further include a distance measurement sensor unit for measuring the distance between the nozzle and the impact point.

As described above, the information that the jet environment information provider provides may be information that a user pre-stored in the storage part or shape information determined by the sensing part in real time. The jet environment information provider may provide the jet environment information that includes 3D shape information surrounding the impact point, the material of the impact point, the distance between the nozzle and the impact point provided from the sensing part, and information about the characteristics of ink including surface tension of the ink, viscosity of the ink, electrical conductivity of the ink, permittivity, and the information about the size of the nozzle, to the controller 130.

The controller 130 may accumulate pre-printing results according to the jet environment information and the printing conditions in a database, and based on this, predict a result to be actually printed on the substrate (S). For example, the database may include results where ink having a viscosity range of 1 to 200,000 cPs is jetted.

Therefore, when performing printing, printing can be performed by changing the printing conditions in real time to the optimal printing conditions provided by the database by inputting the jet environment information provided by the jet environment information provider.

More specifically, the controller 130 includes a printing prediction model where printing results for various jet environment information and printing conditions are constructed using machine learning techniques, and the controller 130 performs printing while changing the printing condition according to the location of the nozzle 110 under the printing condition provided by the printing prediction model based on the jet environment information that the jet environment information provider provides regarding the point where the nozzle is currently located 110.

In the case of a three-dimensional surface, the distribution of the electric field varies depending on the shape of the surface, so printing cannot be performed precisely simply by keeping the distance between the three-dimensional surface and the nozzle 110 constant. Accordingly, the present disclosure enabled to understand the electric field distribution between the nozzle 110 and the impact point according to the shape of the structure surrounding the impact point, and the printing conditions are controlled accordingly to perform printing.

Accordingly, the predicting prediction model is where printing results for various jet environment information and printing conditions are constructed, and at the current nozzle 110 location, with an input of the jet environment information that the jet environment information provider provides, the printing prediction model obtains the optimal printing condition and performs printing accordingly.

More specifically, the printing prediction model may be constructed by determining the electric field distribution between the nozzle 110 and the impact point in consideration of the viscosity of the ink, electrical conductivity of the ink, size of the nozzle 110, and the space information surrounding the impact point including the distance between the nozzle 110 and the impact point, and based on this, securing a flight trajectory according to the charge amount of the droplet to perform printing, and by comparing with the final pattern to be printed.

Here, the printing condition may include any one or more of the intensity of the voltage for forming the electric field, the jetting angle of the nozzle, the distance between the nozzle and the impact point, the jetting speed of the droplet, the amount of charge of the droplet, and the flow rate of ink being supplied to the nozzle.

FIG. 11 shows a process of constructing a printing prediction model according to the present disclosure and a result of comparing a printing predicted result predicted from the printing prediction model and an actually measured printing result.

The upper part of FIG. 11 describes the process of constructing the printing prediction model using machine learning techniques. With an input of the jet environment information surrounding the impact point provided by the jet environment information provider, a predicted printing result provided by the printing prediction model for the printing condition and an actual printing result for the printing condition are compared between each other, and then this is reflected on a machine learning algorithm, and updated in the printing prediction model. By repeating this learning process, a highly accurate printing prediction model can be constructed for various jet environment information.

Variables for constructing the printing prediction model using machine learning techniques may include at least one or more of an input voltage (magnitude) for forming an electric field, impact location of the droplet according to the 3D surface shape, impact path, distance between the tip of the nozzle and the impact point, charge amount of the droplet, electric field distribution between the nozzle and the impact point, material of the impact point, ink characteristics such as viscosity of the ink and electrical conductivity of the ink, and size of the nozzle.

Here, the variable may be an actual value obtained from experiment or may be a value obtained from simulation through computerized analysis. For example, in the present disclosure, the electric field distribution may be obtained through simulation.

The method for controlling the electrohydrodynamic jet printing apparatus according to the present disclosure may include determining the droplet size being ejected and controller 130 controlling in real time the voltage being applied to the electrode based on the size of the droplet such that the droplet size being ejected is constant in consideration of the physical properties including the viscosity of the ink changing due to evaporation of the ink supplied to the nozzle 110.

Here, the controller 130 may control in real time the flow rate of the ink being supplied to the nozzle 110 by controlling the ink supplier 125 that supplies ink to the nozzle 110 such that the size of the droplet being ejected from the nozzle 110 is constant.

Here, the determining the size of the droplet may be performed by the image acquisition part 150 acquiring an image of the droplet impacted on the substrate (S) and then determining the size of the droplet from the size area of the droplet in the acquired image. The controller 130 may determine in real time the size of the droplet being ejected and control the voltage being applied to the electrode to generate an electric field such that droplets having reference size can be ejected continuously or control the flow rate of the ink being supplied to the nozzle 110 from the ink supplier 125.

Here, in order to obtain the reference size of the droplet, prior to printing, ejecting the optimal volume droplet on the substrate (S) or on a separate test substrate, and the image acquisition part 150 acquiring an image of the optimal volume droplet and obtaining the size of the optimal volume droplet and storing it may be included. Using the stored droplet size as a reference, the controller 130 may obtain in real time the size of the droplet being ejected, and accordingly, control the voltage being applied to the electrode to generate an electric field or control the flow rate of the ink being supplied to the nozzle 110 from the ink supplier 125.

The scope of the present disclosure is not limited to the above-described embodiments, but may be implemented in various forms of embodiments within the scope of the appended claims. It is deemed to be within the scope of the claims of the present disclosure to the extent that anyone skilled in the art can make modifications without departing from the gist of the present disclosure as claimed in the claims.

REFERENCE NUMERALS

110: Nozzle
120: Voltage Supplier
125: Ink Supplier
130: Controller
140: Droplet Volume Measurement Part
150: Image Acquisition Part
S: Substrate

What is claimed is:

1. An electrohydrodynamic jet printing apparatus comprising:

a nozzle that ejects supplied ink as a droplet towards a substrate;

an electrode that is formed on the nozzle to form an electric field between the nozzle and the substrate by an applied voltage;

a voltage supplier that applies the voltage to the electrode;

an ink supplier that supplies the ink to the nozzle;

an image acquisition part that acquires an image of the ink ejected from the nozzle;

a droplet volume measurement part that measures a volume of the droplet ejected to the substrate or to a separate test substrate; and a controller that controls the voltage supplier and the ink supplier, wherein the controller is configured to control in real time the voltage being applied from the voltage supplier to the electrode such that a size of the droplet being ejected from the nozzle is constant, wherein the controller is configured to control in real time a flow rate of the ink being supplied to the nozzle by controlling the ink supplier such that the size of the droplet being ejected is constant, wherein the controller is configured to obtain the size of the droplet from the image acquired by the image acquisition part, and based on this, control in real time the voltage being applied to the electrode from the voltage supplier or control in real time the flow rate of the ink being supplied to the nozzle by controlling the ink supplier, wherein the image acquisition part is configured to acquire the image of the droplet impacted on the substrate, and the controller is configured to obtain the size of the droplet from a size area of the droplet of the acquired image, wherein the controller is configured to, prior to printing, eject an optimal volume droplet to the substrate or to a separate test substrate, cause the droplet volume measurement part to measure the volume of the ejected droplet, and upon confirmation of the optimal volume droplet, obtain and store the size of the optimal volume droplet from the image acquired by the image acquisition part, and wherein the controller is configured to, during printing, compare the stored size of the optimal volume droplet and the size of the droplet obtained from the image acquired by the image acquisition part in real time and then control in real time the voltage being applied to the electrode from the voltage supplier or control in real time the flow rate of the ink being supplied to the nozzle by controlling the ink supplier, such that a constant droplet size is maintained even when physical properties of the ink change due to evaporation of an ink solvent.

2. The electrohydrodynamic jet printing apparatus according to claim 1, wherein the controller controls a cycle or magnitude of the voltage being supplied from the voltage supplier.

3. The electrohydrodynamic jet printing apparatus according to claim 1, wherein the voltage supplier comprises a first voltage supplier that supplies the voltage in a certain cycle and magnitude; and a second voltage supplier that supplies an additional voltage that is combined with to the voltage being supplied from the first voltage supplier to form an aggregate voltage applied to the electrode, wherein the controller controls such that the size of the droplet being ejected is constant by controlling the second voltage supplier according to the size of the droplet being detected in real time.

4. The electrohydrodynamic jet printing apparatus according to claim 1, wherein the ink supplier comprises a flow rate controller using pneumatic pressure, screw rotation or piezoelectric force, the controller controlling in real time the flow rate of the ink being supplied to the nozzle by controlling the flow rate controller.

5. The electrohydrodynamic jet printing apparatus according to claim 1, further comprising:

a jet environment information provider that provides jet environment information between the nozzle and an impact point, wherein the controller accumulates a pre-printing result according to the jet environment information and a printing condition in a database, to predict an actual result being printed on a substrate, and perform printing while changing the printing condition provided in the database based on the jet environment information provided from the jet environment information provider.

6. The electrohydrodynamic jet printing apparatus according to claim 5, wherein the controller constructs a printing prediction model for predicting an actual result being printed on the substrate using machine learning techniques based on the database regarding the jet environment information and the printing condition, and controls printing under the printing condition provided in the printing prediction model based on the jet environment information.

7. A method for controlling printing of an electrohydrodynamic jet printing apparatus that ejects a droplet towards a substrate using a force of an electric field generated by a voltage being applied to an electrode formed on a nozzle, the method comprising:

obtaining a size of the droplet being ejected;

controlling in real time the voltage being applied to the electrode such that the size of the droplet being ejected from the nozzle is constant, controlling in real time a flow rate of an ink being supplied to the nozzle by controlling an ink supplier that supplies the ink to the nozzle such that the size of the droplet being ejected from the nozzle is constant wherein the size of the droplet is obtained by acquiring an image of the droplet impacted on the substrate and then obtaining a size area of the droplet of the acquired image, ejecting an optimal volume droplet to the substrate or to a separate test substrate prior to printing; and obtaining and storing the size of the optimal volume droplet from the image of the droplet impacted on the substrate, and comparing the stored size of the droplet and the size of the droplet obtained from the acquired image in real time, and then controlling in real time the voltage being applied to the electrode such that the size of the droplet being ejected from the nozzle is constant or controlling in real time the flow rate of the ink being supplied to the nozzle.

* * * * *